Feb. 19, 1952     E. A. ESKOLA     2,586,761
DISPENSER FOR INSECT-REPELLENT MATERIAL
Filed Sept. 30, 1949
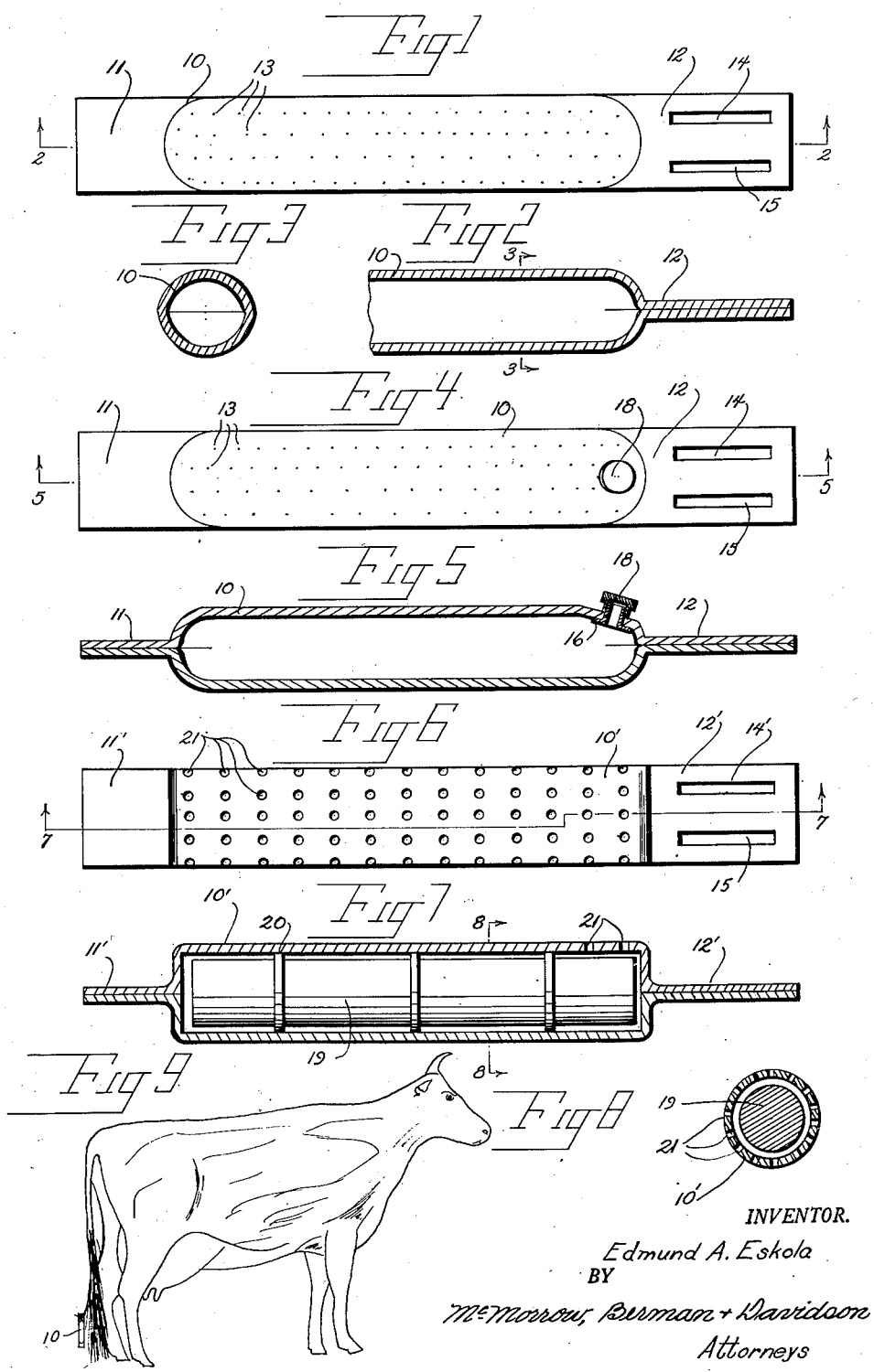
INVENTOR.
Edmund A. Eskola
BY
McMorrow, Berman + Davidson
Attorneys Patented Feb. 19, 1952

2,586,761

UNITED STATES PATENT OFFICE 2,586,761

DISPENSER FOR INSECT-REPELLENT MATERIAL

Edmund A. Eskola, Bothell, Wash.; Lempi M. Eskola administratrix of said Edmund A. Eskola, deceased Application September 30, 1949, Serial No. 118,813

4 Claims. (Cl. 119—157)

This invention relates to dispensers for insect-repellent material, and more particularly to a dispenser attachable to the tail of an animal, such as a cow or horse, to dispense insect-repellent material incident to the swishing of the tail by the animal in the attempt to remove insects.

It is among the objects of the invention to provide an improved insect-repellent dispenser of small size and light weight which can be easily secured to the tail of an animal, such as a cow or horse, and will dispense insect repellent contained therein, at a rate proportional to the amount of tail swishing of the animal, which is more-or-less proportional to the prevalence of insects, such as flies and gnats, and will dispense the material at a slow rate over a long period of time, which is of small size and light weight and of a flexible or resilient nature, so that it will not bruise or injure an animal to which it is attached, which is easily modified to contain repellent material in either liquid, powder or cartridge form, and which is simple in construction, extremely economical to manufacture, and easy to attach to the tail of an animal so that it will not be accidentally lost.

Other objects and advantages will become apparent from a consideration of the following description and the appended claims in conjunction with the accompanying drawing, wherein:

Figure 1 is a longitudinal side elevation of a dispenser, illustrative of the invention;

Figure 2 is a longitudinal cross-section of a fragmentary portion of the dispenser taken on the line 2—2 of Figure 1;

Figure 3 is a transverse cross-section on the line 3—3 of Figure 2;

Figure 4 is a longitudinal side elevation of a somewhat modified form of dispenser;

Figure 5 is a longitudinal cross-section on the line 5—5 of Figure 4;

Figure 6 is a longitudinal side elevation of a still further modified form of dispenser;

Figure 7 is a longitudinal cross-section on the line 7—7 of Figure 6;

Figure 8 is a transverse cross-section on the line 8—8 of Figure 7; and

Figure 9 is a somewhat diagrammatic view of a cow showing the manner of attaching the insect-repellent dispenser to the tail of the cow.

With continued reference to the drawing, the dispenser comprises an elongated tube or capsule 10 of a pliable or resilient material, such as a synthetic rubber or synthetic resin material having flattened, closed portions 11 and 12 at its respectively-opposite ends. Between the closed portions the tube or capsule is filled with a body of insect-repellent material of any desired composition and which may be in either powder or liquid form, and the wall of the tube between the closed ends thereof is perforated with a large number of very small perforations 13 which will permit the repellent material to pass slowly through the perforated wall of the tube.

One of the flattened end portions is made somewhat longer than the other, this being the portion 12, as illustrated in Figure 1, and this portion is provided with two spaced-apart, elongated openings 14 and 15.

In attaching the dispenser to an animal, some of the hairs at the center of the group of hairs growing from the tail of the animal are separated into two strands of suitable size, which strands are passed respectively through the openings 14 and 15, and tightly knotted adjacent the portion of the dispenser in which these openings are provided. A suitable cement, such as a quick-drying cellulosic cement, is then applied to the knot formed in the tail hairs of the animal, so that these knots will not become loosened or untied, resulting in accidental loss of the dispenser.

The tube is of small size, dimensions of approximately one-half-inch diameter and six inches in length having been found sufficient to contain enough insect repellent to last substantially through the season of troublesome insect prevalence, is consequently light in weight, and because of this small size, light weight and the flexible or resilient nature of the material of which it is formed, will not bruise or injure the animal when struck against the sides of the animal by swishing movements of the animal's tail. The impact of the dispenser against the sides and back of the animal causes the repellent material to be dispensed through the perforations 13 and the rate at which the material is dispensed will thus be proportional to the rate at which the animal moves its tail to dislodge insects from its body, and this is more-or-less proportional to the prevalence of the insects. However, as the perforations 13 are extremely small, the material will be dispensed at a slow rate over a long period of time.

The form of the invention shown in Figures 4 and 5 is the same as that shown in Figures 1, 2 and 3, except that a small, screw-threaded filler neck or eyelet 16 is secured in the hollow body or tube 10 adjacent one of the closed end portions of the tube, and a screw cap 18 is threaded onto the portion of this neck projecting outwardly of the body. By removing the cap 18, the body can be refilled with liquid repellent from a receptacle, such as a pressure-dispensing oil can, or a syringe.

The form of the device shown in Figures 1, 2 and 3 is particularly adapted for use on range or grazing cattle, whereas, the form shown in Figures 4 and 5 is more particularly designed for use on dairy cattle where insects, such as flies, are more prevalent, and the animals are more constantly cared for.

The form of the invention shown in Figures 6 and 7 is also generally similar to the form shown in Figures 1, 2 and 3, and described above, but in the case of the form shown in Figures 6 and 7, an elongated cake or cartridge 19 of repellent material is placed in the tube before at least one of the end portions of the tube is flattened and sealed to close the tube. This cartridge 19 may be of elongated, generally cylindrical shape and preferably has annular ribs or extensions 20 spaced apart longitudinally thereof to maintain the major portion of the surface of the cartridge or filler out of contact with the wall of the tube. Also, the perforations 21 in this modified form of the invention, are made larger than the perforations 13 in the forms illustrated in Figures 1 to 5 inclusive, since it is mainly the vapor or sublimation from the solid core 19 which passes through the perforations, rather than the material of the core itself.

Because of the modified size of the perforations the tubular body of the form of the dispenser illustrated in Figures 6 and 7 is designated as 10', the closed end portions as 11' and 12' and the openings for attaching the dispenser to the tail of an animal as 14' and 15'.

Because of its small size, light weight and pliable or flexible nature, the device causes no discomfort, inconvenience, or injury to the animal to which it is attached, and is highly effective in repelling insects from the animal.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An insect-repellent dispenser comprising an elongated, perforated tube having closed ends and a body of insect-repellent material therein, said tube having apertures in the wall thereof for dispensing insect repellent material when the dispenser is struck and having at one end a flattened portion provided with spaced apart slots for receiving strands of hair of an animal's tail and through which such strands may be tied to secure the dispenser to an animal.

2. An insect-repellent dispenser comprising an elongated tube of flexible material having flattened, closed portions at its opposite ends and perforations in its wall between such closed end portions, one of said closed end portions having spaced apart openings therein for receiving strands of animal hair to attach the dispenser to the tail of an animal.

3. An insect-repellent dispenser comprising an elongated tube of flexible material having flattened, closed portions at its opposite ends and perforations in its wall between such closed end portions, one of said closed end portions having an opening therein for attaching the dispenser to the tail of an animal, a screw-threaded filler neck projecting from said tube near one of said closed end portions, and a closure cap threaded onto said neck.

4. An insect-repellent dispenser comprising an elongated tube of flexible material having flattened, closed portions at its opposite ends and perforations in its wall between such closed end portions, one of said closed end portions having an opening therein for attaching the dispenser to the tail of an animal, and a cartridge of solid, repellent material in said tube between said closed end portions, said cartridge having spaced-apart, annular ribs thereon to maintain the wall of said tube out of conact with the surface of said cartridge.

EDMUND A. ESKOLA.

REFERENCES CITED

The following references are of record in the file of this patent:

UNITED STATES PATENTS

| Number | Name | Date |
|---|---|---|
| 376,665 | Leathers | Jan. 17, 1888 |
| 934,283 | Case | Sept. 14, 1909 |
| 1,237,123 | Swearingen | Aug. 14, 1917 |
| 1,956,276 | Cook | Apr. 24, 1934 |
| 2,138,040 | Perry | Nov. 29, 1938 |
| 2,462,689 | Stretz | Feb. 22, 1949 |